UNITED STATES PATENT OFFICE.

LOUIS ENRICHT, OF NEW YORK, N. Y., ASSIGNOR TO THE ENRICHT MANUFACTURING COMPANY, OF SAME PLACE.

ARTIFICIAL-STONE COMPOSITION.

SPECIFICATION forming part of Letters Patent No. 449,151, dated March 31, 1891.

Application filed June 24, 1889. Serial No. 315,430. (No specimens.)

*To all whom it may concern:*

Be it known that I, LOUIS ENRICHT, a citizen of the United States, residing in the city and county of New York, State of New York, have invented a new and useful Composition of Matter for the Production of Artificial Stone, of which the following is a full and exact specification.

To four parts, by weight, of a solution of magnesium chloride of about 35° Baumé I add four parts, by weight, of magnesium oxide and mix them with about three parts of fluor-spar pulverized, stirring the mixture thoroughly.

After the ingredients are thoroughly mixed, so as to form a plastic mass, I produce therefrom such articles as may be desired by means of molds or dies, applying pressure thereto, if required. In this manner articles of use and ornament can be made from the composition. If it is desired, the composition can be tinted or colored by adding any suitable coloring-matter to the mass before it is placed in the molds. The mass begins to crystallize after about six hours in the ordinary temperature, and it becomes hard after about twenty-four hours.

The product is an artificial stone which resists fire and water and is of great hardness and strength. It can be used in the form of tiles for pavements or for roofs and as ornaments for buildings, monuments, statuary, and a variety of other articles which are usually cut or chiseled from stone or produced from clay by molding and baking.

Having thus described my invention, what I claim as new, and desire to secure by Letters Patent, is—

A composition of matter consisting of magnesium chloride in solution, magnesium oxide, and fluor-spar, in substantially the proportions specified.

LOUIS ENRICHT.

Witnesses:
ALSON L. DRAKE,
WALTER S. WILSON.